(12) United States Patent
Dowell et al.

(10) Patent No.: US 9,194,225 B2
(45) Date of Patent: Nov. 24, 2015

(54) SYSTEMS AND METHODS FOR SENSING A FLUID LEVEL WITHIN A PIPE

(71) Applicants: James David Dowell, Sugar Land, TX (US); Melvin Clark Thompson, Los Alamos, NM (US)

(72) Inventors: James David Dowell, Sugar Land, TX (US); Melvin Clark Thompson, Los Alamos, NM (US)

(73) Assignee: Chevron U.S.A. Inc., San Ramon, CA (US)

(*) Notice: Subject to any disclaimer, the term of this patent is extended or adjusted under 35 U.S.C. 154(b) by 151 days.

(21) Appl. No.: 13/670,775

(22) Filed: Nov. 7, 2012

(65) Prior Publication Data

US 2014/0124210 A1    May 8, 2014

(51) Int. Cl.
*E21B 7/12*     (2006.01)
*E21B 47/04*    (2012.01)
*G01F 23/284*   (2006.01)
*E21B 21/08*    (2006.01)

(52) U.S. Cl.
CPC .............. *E21B 47/042* (2013.01); *E21B 21/08* (2013.01); *G01F 23/284* (2013.01)

(58) Field of Classification Search
CPC ........................... E21B 47/0001; E21B 47/042
USPC .......... 166/336, 358, 250.01, 250.03; 175/40; 340/854.6
See application file for complete search history.

(56) References Cited

U.S. PATENT DOCUMENTS

| 4,621,264 | A | 11/1986 | Yashiro et al. |
| 7,228,900 | B2* | 6/2007 | Schultz et al. ........... 166/250.01 |
| 8,188,748 | B2* | 5/2012 | Schaug-Pettersen ......... 324/334 |
| 2007/0289746 | A1 | 12/2007 | Fossli |
| 2011/0297388 | A1* | 12/2011 | Stave ............................ 166/345 |
| 2012/0084055 | A1 | 4/2012 | Smithson |

OTHER PUBLICATIONS

International Search Report for PCT/US2013/067932 dated Jan. 10, 2014, 5 pages.
Kenneth P. Malloy, Risk Profile of Dual Gradient Drilling, Bureau of Ocean Energy Management, Regulation, and Enforcement Technology Assessment and Research Program, Operational Safety and Engineering Research Contract M09PC0016, May 2, 2011 Final Report, 111 pages.
DEA Presentation, Dual Gradient Drilling the System, David Dowell Chevron North America Exploration and Production Company, Jul. 23, 2011, 42 pages.

* cited by examiner

*Primary Examiner* — Matthew Buck
*Assistant Examiner* — Aaron Lembo
(74) *Attorney, Agent, or Firm* — Parul Anderson

(57) ABSTRACT

A system, method and device may be used to monitor fluid levels in a drill pipe in borehole. The system includes an electromagnetic (EM) generator to generate a traveling wave of electromagnetic energy to propagate along a linear path through the drill pipe towards a surface of the fluid, a detector to detect a portion of the electromagnetic wave reflected from the surface of the fluid and propagated through the drill pipe towards the detector, a processor to analyze detected signals to determine a level of the surface of the fluid. In an embodiment, the system includes a pump controller to control the operation of a pump located in the wellbore or at the mudline based on the fluid surface level.

4 Claims, 3 Drawing Sheets

SYSTEMS AND METHODS FOR SENSING A FLUID LEVEL WITHIN A PIPE

TECHNICAL FIELD

The present application relates generally to remote sensing within a conduit, and more particularly to sensing of a fluid level, such as mud level, within a drill pipe.

BACKGROUND

In resource recovery, it may be useful to monitor the fluid level within a pipe at any level of a borehole that has been drilled either for exploratory or production purposes, for example, in dual gradient drilling applications. For instance, the fluid level within the pipe can be an indicator of the pressure seen by the lower end of the borehole. Generally, pressure will lift, or stabilize, the fluid within the pipe to a level such that the hydrostatic column of fluid balances the pressure being applied to the lower end of the pipe. Knowing the actual height of the fluid and the density or weight of the fluid allows a user to readily determine the hydrostatic pressure of the system. Typically, if the hydrostatic pressure is greater than the pressure exerted by the surrounding formations then positive hydrostatic pressure occurs. When a well is drilled using rotary drilling methods, it is customary to maintain the weight of the drilling fluid at a weight that gives positive hydrostatic pressure. The advantage of positive hydrostatic pressure is that the formation fluids do not escape.

During production, the fluid level of the well is typically measured using a device such as an echometer. Generally, the echometer sends a pressure pulse generated by a compressed air source or by an explosive charge into a pipe. The sound wave that is generated travels through the pipe and is reflected at the fluid interface. However, the use of the echometer generally requires that the pipe be filled with a gas that can transmit sound waves. In some drilling applications, having a pipe downhole filled with gas is not a feasible option since the pipe may be sealed from the environment and may only contain a vacuum, thus rendering the echometer unusable.

SUMMARY

An aspect of an embodiment of the present invention includes an apparatus for measuring a fluid level in a drill pipe in a wellbore, including an electromagnetic launcher positionable and operable to apply electromagnetic energy to propagate linearly along the drill pipe towards a surface of the fluid, a detector, positionable and operable to detect a portion of the electromagnetic wave reflected from the surface of the fluid and propagated along the drill pipe towards the detector, a processor, configured and arranged to receive signals from the detector representative of the detected portion of the electromagnetic wave and to analyze them to determine a level of the surface of the fluid, and possibly a pump controller, configured and arranged to receive distance information from the processor and to use the distance information to control the operation of a pump.

Another aspect of an embodiment of the present invention includes a method for measuring a fluid level in drill pipe that includes generating a wave of electromagnetic energy to propagate along a linear path through the drill pipe towards a surface of the fluid, detecting a portion of the electromagnetic wave reflected from the surface of the fluid and propagated through the drill pipe towards the detector, receiving a signal from the detector representative of the detected portion of the electromagnetic wave, and analyzing the signal to determine a level of the surface of the fluid.

BRIEF DESCRIPTION OF THE DRAWINGS

For a more complete understanding of the exemplary embodiments of the present invention and the advantages thereof, reference is now made to the following description in conjunction with the accompanying drawings, which are briefly described as follows.

DETAILED DESCRIPTION

Figure 1:
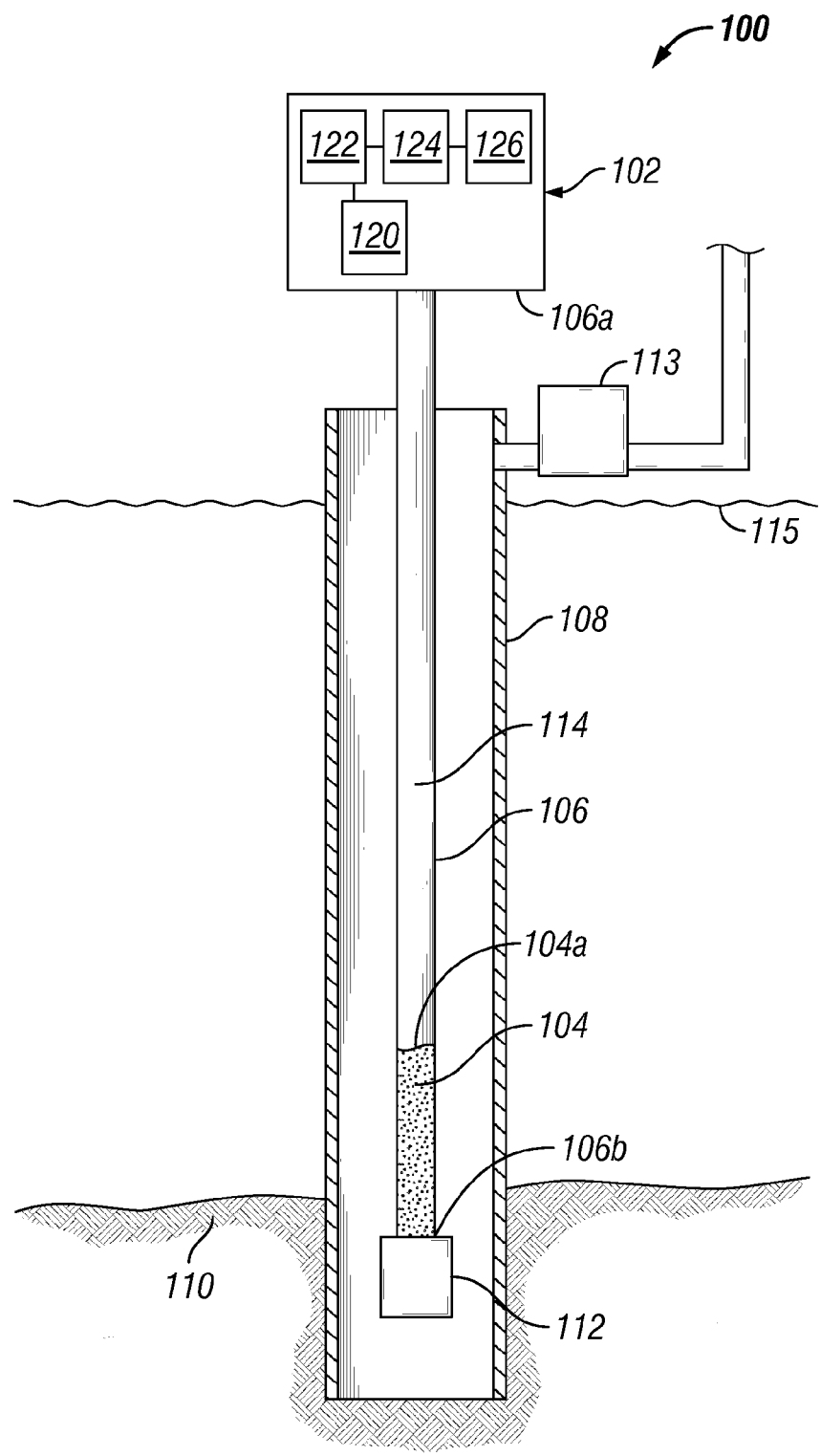
FIG. 1 is a schematic illustration of a system for remotely measuring a fluid level in a pipe downhole in accordance with an embodiment of the present invention.

Illustrative embodiments of the invention are described below. In the interest of clarity, not all features of an actual implementation are described in this specification. One of ordinary skill in the art will appreciate that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention may be better understood by reading the following description of non-limitative embodiments with reference to the attached drawings wherein like parts of each of the figures are identified by the same reference characters. The words and phrases used herein should be understood and interpreted to have a meaning consistent with the understanding of those words and phrases by those skilled in the relevant art. No special definition of a term or phrase, for example, a definition that is different from the ordinary and customary meaning as understood by those skilled in the art, is intended to be implied by consistent usage of the term or phrase herein. To the extent that a term or phrase is intended to have a special meaning, for instance, a meaning other than that understood by skilled artisans, such a special definition will be expressly set forth in the specification in a definitional manner that directly and unequivocally provides the special definition for the term or phrase.

FIG. 1 illustrates a system 100 having a device 102 for remotely sensing a surface level 104a of a fluid 104 within a conduit or drill pipe 106 within a borehole 108. The system 100 can be used in conventional drilling applications. In the illustrated example, the borehole 108 extends through a hydrocarbon producing formation 110 or any other rock strata that contains pressure. In certain embodiments, the drill pipe 106 is generally conductive. In certain other embodiments, the drill pipe 106 is fabricated from a nonconductive material, such as ceramic, and includes a generally conductive coating, such as aluminum or steel, on the interior (inner diameter) of the drill pipe 106. The drill pipe 106 has an upper end 106a and a lower end 106b. The device 102 is positioned at the upper end 106a of the drill pipe 106, at the end opposite from the fluid 104. In certain exemplary embodiments, the device 102 is coupled to the upper end 106a of the drill pipe 106 by a direct attachment or may be otherwise electromagnetically coupled to the drill pipe 106. In certain embodiments, a pump 112 is coupled to the lower end 106b of the drill pipe 106. In certain exemplary embodiments, the pump 112 is coupled to the lower end 106b of the drill pipe 106 by a direct attachment or may be otherwise indirectly coupled to the drill pipe 106. In certain exemplary embodiments, a pump 113 is coupled to the annulus of borehole 108 at or near a mudline (or surface) 115, and is used to control the fluid 104 level or pressure at the formation 110.

The fluid 104 within the drill pipe 106 can be any reflective fluid with a radar cross-section. For instance, the fluid 104 can be a drilling fluid, such as a drilling mud, a production fluid in workover operations, or a produced fluid from production operations. The drill pipe 106 also includes an area 114 defined between the upper end 106a and the surface level 104a of the fluid 104. In certain embodiments, the area 114 includes a vacuum. In certain embodiments, the area 114 includes air. In certain exemplary embodiments, knowing the level 104a of the fluid 104 can be used to determine the pressure in a zone of the hydrocarbon producing formation 110 and thus, be used to determine the density and type of additional fluid, such as drilling fluid, needed to reduce loss of fluid to the hydrocarbon producing formation 110. Accordingly, in order to minimize fluid loss in the system, it is useful to provide for measurement of the surface level 104a of the fluid 104 within the drill pipe 106.

The device 102 for sensing the surface level 104a includes an electromagnetic generator 120. The generator 120 may be any device including, but not limited to, an electronic structure for receiving electromagnetic energy and generating a microwave signal of either pulsed or the preferable continuous wave (CW) modulated form therefrom, which is transmitted along the length of the drill pipe 106. In general, radio frequency electromagnetic wave sources are well-suited to this application, in particular in a range from about 1000 megahertz (MHz) to about 3000 MHz. The frequency can be selected as a function of the inner diameter of the drill pipe 106. In exemplary embodiments, the wavelength ($\lambda$) is a narrow band of microwave wavelengths determined by the inner diameter of the drill pipe 106 that is constructed from a conductive material (for instance, steel).

Though the borehole 108 is illustrated as a straight, vertical bore, in practice the borehole 108 can have a more complex geometry and can have any orientation, including varying orientation along its length. In addition, though the drill pipe 106 is illustrated as a straight, vertical pipe, the drill pipe 106 can have a more complex geometry and can have any orientation, including varying orientation along its length, as long as the path from the device 102 to the surface level 104a of the fluid 104 is not obstructed. In certain exemplary embodiments, the path from the device 102 to the surface level 104a of the fluid 104 is a straight, linear line. Generally, the drill pipe 106 acts as a waveguide such that the signal is not degraded significantly (but suffers allowable loss per unit length) as it is transmitted from the first end 106a down towards surface level 104a of the fluid 104 in the drill pipe 106. In exemplary embodiments, the frequency of the signal is tuned to match an internal diameter of the drill pipe 106. In the circular wave guide case, such as for drill pipe 106, the "cut-off" wavelength ($\lambda$) is approximately $\lambda=0.59*ID$, where ID is the internal diameter of the drill pipe 106. In exemplary embodiments, successful operation is between about 1.1 to about 1.25 that of the lower cut-off frequency. Having a frequency in tune with the inner diameter of the drill pipe 106 allows the drill pipe 106 to act as a waveguide and helps propagate the electromagnetic energy through the space 114 of the drill pipe 106. The microwave energy is then reflected at the surface level 104a of the fluid 104, at the interface of the fluid 104 and the vacuum or air/gas space 114, due to the difference in electrical character between the fluid 104 and the vacuum or air. The reflected signals are then received by a receiver or detector 122 in the device 102.

The reflected signals can be used to calculate the distance between device 102 and the fluid 104, and thereby determine the surface or fluid level 104a of the fluid 104. In certain exemplary embodiments, the device 102 also includes a processor 124 that is used to analyze the received signals to determine the fluid level 104a of the fluid 104 in the drill pipe 106. In certain exemplary embodiments, the measurements may be performed continuously and in real time. The processor 124 can calculate the distance based on a measure of the time delay (to include knowledge of the "group delay" at the frequency used) between launching the wave and receiving the return signal using Equation 1:

$$D(ft)=\frac{1}{2}*1.017(ns/ft)*t_m*Tg \quad \text{Equation 1}$$

where D is the distance, $t_m$ is the measured time (time received is the two-way time of flight), and Tg is the group delay factor determined by the waveguide effects for each diameter (typically a measured effect). In certain exemplary embodiments, the frequency modulated continuous wave (FMCW) method allows measurement of distances for very close in target to near zero (which may be difficult with the pulse method). In certain exemplary embodiments, the group delay (Tg) is calibrated using the reflections from each 'joint' internal diameter change detected in the near field of a measurement sweep. The FMCW method results in a detected frequency that is the delayed modulated function (delayed by the distance) mixed with the present modulation function to determine the difference frequency. The resulting difference or intermediate frequency (IF) is the product used in the calculation function. Final calibration of the instrument will be formed into a "look-up" table stored in the processor memory.

In certain exemplary embodiments, once a signal is detected, the detector 122 is powered off. In certain other embodiments, the signal could be continuously monitored for well control issues.

Furthermore, the processor 124 may be used to operate a pump controller 126 to change an operation state of the pump 112, based on the measured fluid level 104a. Suitable examples of pumps 112 include, but are not limited to, electrical submersible pumps and progressing cavity pumps. The pump controller 126 may be linked directly (not shown) or wirelessly to the pump 112 or 113. In particular, the pump controller 126 may reduce pumping capacity by adjusting pump operation speed or stroke if the fluid level 104a is too low. In certain exemplary embodiments, successive measurements may be taken and used to determine a magnitude and direction of change of the fluid level 104a. In these embodiments, the magnitude and/or direction may be used to control the pump capacity. For instance, if the fluid level 104a is changing rapidly, the pump capacity may be changed rapidly as well. Likewise, if the fluid level 104a is changing slowly, the pump controller 126 may increase or reduce pump capacity by only a small amount in order to maintain the fluid level 104a, rather than increasing or reducing by a large amount which may tend to increase or reduce the fluid level 104a undesirably.

Figure 2:
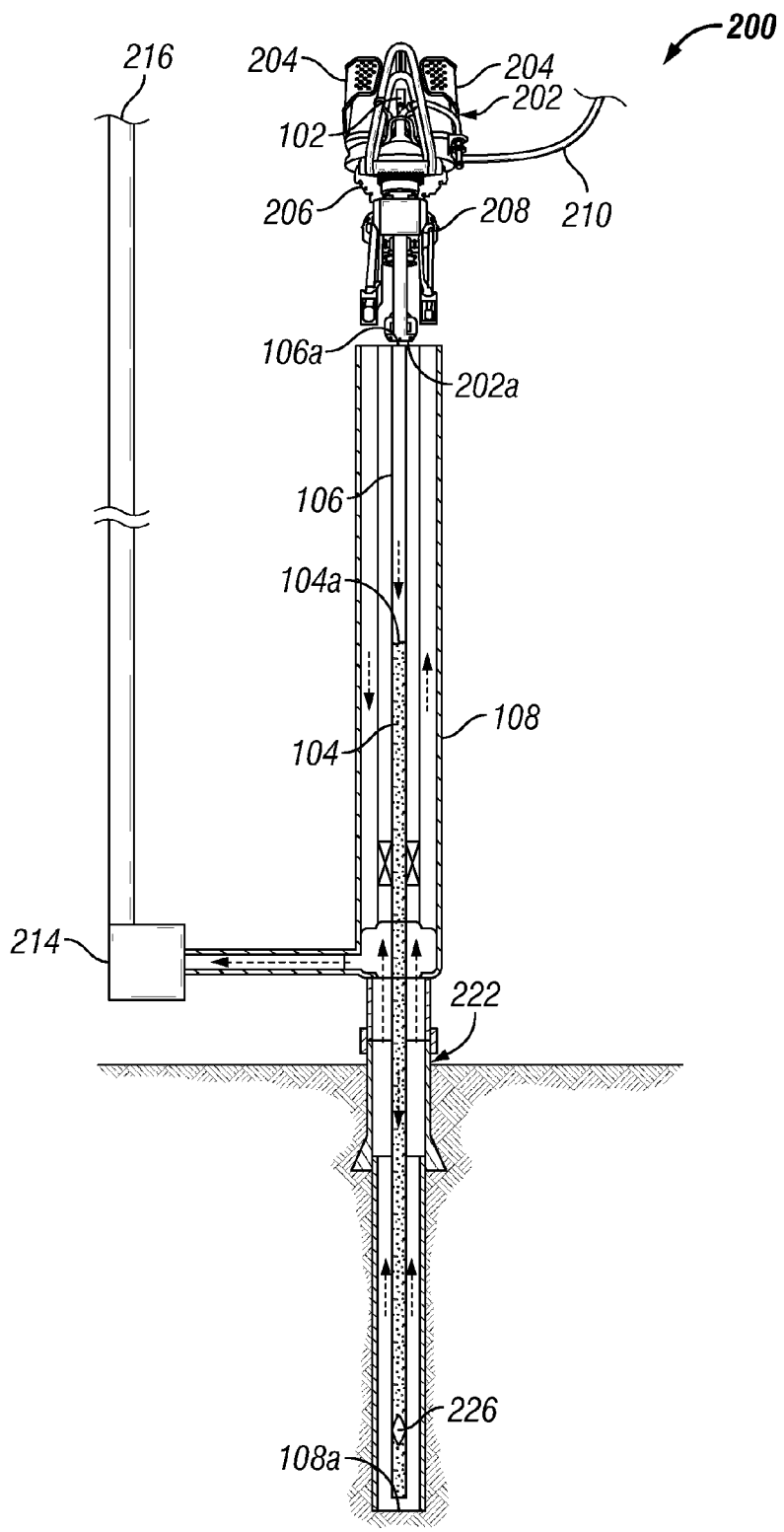
FIG. 2 is a side cross-sectional view of a dual gradient drilling system utilizing the system of FIG. 1 in accordance with an embodiment of the present invention.

FIG. 2 is a side cross-sectional view of a drilling system 200, according to an exemplary embodiment. In certain embodiments, the system 200 is a conventional drilling system. In certain embodiments, the system 200 is a dual gradient drilling system. To access subsea reserves in a deepwater environment, it may be useful to employ a technique known as dual gradient drilling. Generally, dual gradient drilling is a drilling technique employing drilling mud in a drill string down to a wellbore. It employs a drilling mud return path that does not follow the annulus but instead travels by a different route. Dual gradient drilling uses two weights of drilling fluid—one above the seabed, another below. This allows drillers to more closely match the pressures presented by nature and effectively eliminates water depth as a consideration in well design.

Referring to FIG. 2, the system 200 is a dual gradient drilling system that employs the same components as those described above with regard to system 100, except as specifically stated below. For the sake of brevity, the similarities will not be repeated hereinbelow. The device 102 can be mounted on a top drive 202 of system 200. The top drive 202 includes motors 204 used to drive a gear box 206 that rotate the drill pipe 106. The top drive 202 also includes pipe handling equipment 208 for lifting and lowering pipe into a well. A rotary hose 210 is coupled to the top drive 202 to allow drilling mud to flow from a rig mud pump (not shown) to the top drive 202 and then downhole. In certain embodiments, the rotary hose 210 is a flexible, rubber pipe. The upper end 106a of the drill pipe 106 is coupled to a lower end 202a of the top drive 202. In normal operation, the drilling mud is pumped through the rotary hose 210 to the top of the top drive 202 where the mud passes through a hollow motor shaft across a rotating seal and then down into the drill pipe 106 where it makes it way downhole. In a dual gradient system, the fluid travels from a base 108a of the borehole 108 up the annulus to a pump 214. The pump 214 then pumps the mud back to a surface 216. An opening (not shown) at the point where the mud enters the top of the top drive 202 (commonly known as the wireline entry sub) could be used to mount the device 102 which would permits the device 102 to transmit a signal into the drill pipe 106, and receive the reflected signal to determine the surface level 104a of the fluid 104. In certain embodiments, the device 102 can include a valve (not shown), such as a ball valve, that opens when a reading is taken. Generally, the device 102 is mounted to the top drive 202 and positioned such that the signals travel linearly down the drill pipe 106 to the fluid 104, i.e. the signals are not reflected off of the sidewall of the drill pipe 106. As stated earlier, it is important that the frequency of the signal be chosen based on the internal diameter of the drillpipe 106 so that the drill pipe 106 acts as a waveguide and does not prematurely reflex the signal back to the device 102.

In the system 200, the fluid 104 can be a heavier mud with seawater that is pumped downhole through the drill pipe 106, such that a mud column 220 extends only from the base 108a of the borehole 108 to a mudline 222. A drillstring valve 226 positioned at the base 108a of the borehole 108 holds the fluid 104 level steady. The fluid 104 level is generally used to determine the pressure within a zone and helps determine the type of fluid 104 needed in the system 200. However, in certain embodiments, the drillstring valve 226 may fail, thus causing the fluid 104 level in the drill pipe 106 to decrease undesirably. The fluid 104 level is a direct measurement of the current bottom hole pressure and the knowledge of that pressure is important since it can be used to determine the next course of action. An example would be the required fluid weight to balance the pressure so that drilling can continue.

Figure 3:
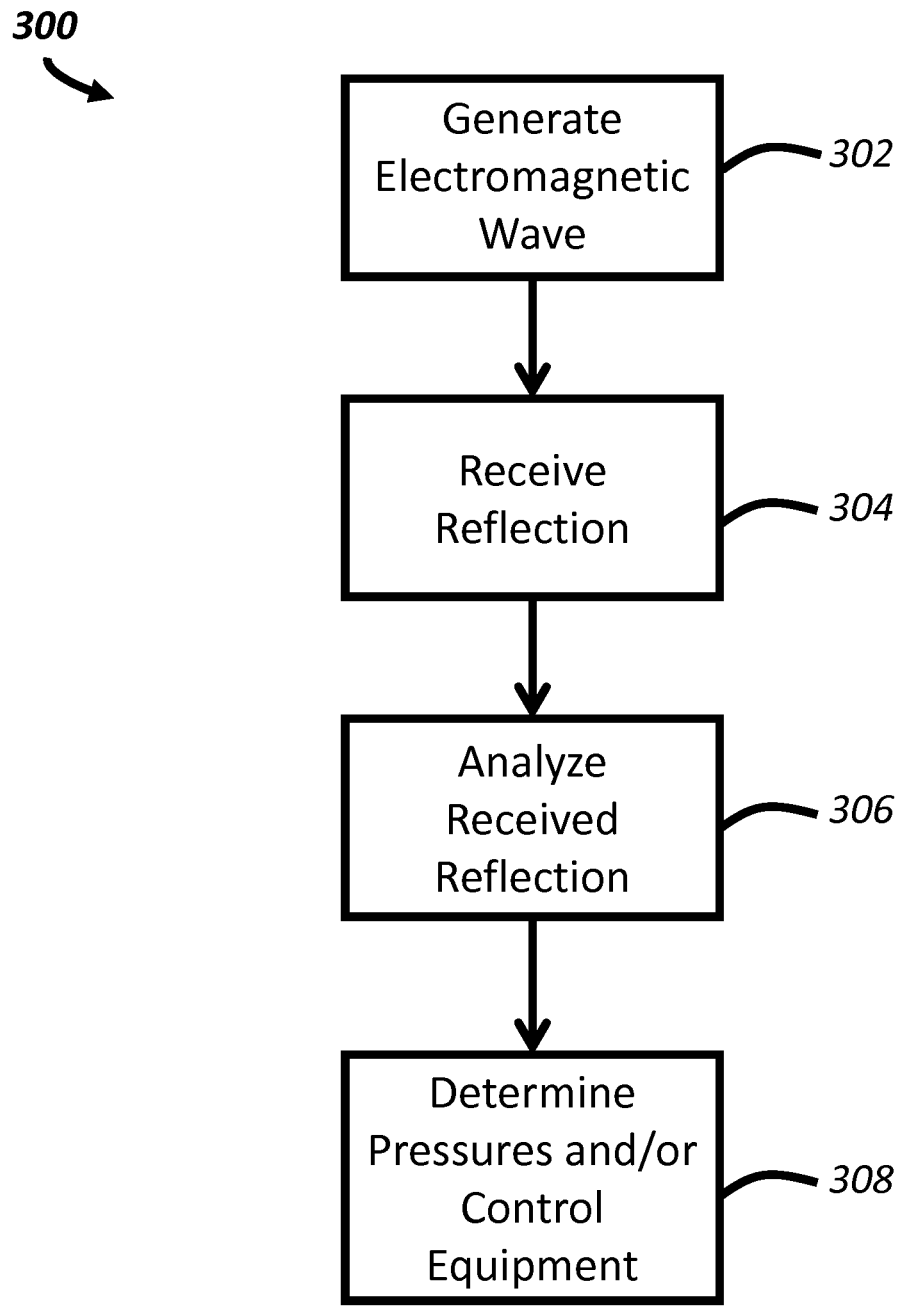
FIG. 3 is a flowchart illustrating a method in accordance with an embodiment of the present invention.

FIG. 3 is a flowchart illustrating a method 300 of operation, described with respect to the system of FIG. 1, according to an exemplary embodiment. In step 302, the electromagnetic generator 120 of the device 102 is used to generate a traveling wave that propagates linearly along the drill pipe 106 in a downhole direction. In step 304, the receiver 122 receives a return signal reflected from the surface level 104a of the fluid 104 that is propagated back up the drill pipe 106. In step 306, the processor 124 then analyzes the received signal to determine a distance to the fluid 104 surface level 104a. In step 308, the distance can be used to determine bottom hole pressures and/or control pumps or other equipment that might be used to change the fluid level, for example, the pump controller 126 can operate to control the operation of the pump 112 as discussed previously with respect to FIG. 1.

The present application is generally directed to systems and methods for detecting a fluid level within a pipe. The exemplary systems may include a device having an electromagnetic wave generator, receiver or detector, processor, and pump controller. Generally, the device is positioned so as to transmit and receive a signal linearly along a pipe. The present invention is advantageous over conventional systems and methods as it provides considerably less signal loss per unit length and once group delay is determined, the propagation velocity is consistent over the entire length of the drill pipe.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. The terms in the claims have their plain, ordinary meaning unless otherwise explicitly and clearly defined by the patentee.

What is claimed is:

1. A system for measuring a fluid surface level of a fluid in a pipe, comprising:

a drill pipe positioned within a wellbore, the drill pipe having an internal diameter, the wellbore being defined by a casing;

a fluid disposed within the drill pipe, the upper portion of the fluid being defined by a surface level, wherein wire transmission lines are not present in the region of the surface level of the fluid;

a pulse generator operable to generate a pulse of electromagnetic wave energy to propagate along the drill pipe towards the surface level of the fluid in the drill pipe, the pulse of electromagnetic wave energy being transmitted along the drill pipe, the length of the wave being preselected and tuned to correlate to the internal diameter of the drill pipe, wherein the lower (minimum) cut-off wavelength ($\lambda$) is calculated to be about $\lambda=0.59$ (ID), wherein ID represents the internal diameter of the drill pipe, further wherein the wavelength of the wave energy deployed to propagate along the drill pipe is between about 1.1 and about 1.5 times the lower cut-off wavelength, and wherein the drill pipe and casing, together, act as a coaxial waveguide for transmission of the signal along the wellbore;

a detector operable to detect a portion of the electromagnetic pulse that is reflected from the surface level of the fluid in the drill pipe and propagated along the wellbore towards the detector;

a processor, configured and arranged to receive a signal from the detector representative of the detected portion of the electromagnetic pulse and to analyze the detected portion of the electromagnetic pulse to determine the position of the surface level of the fluid;

a delay defining a detection time window for detecting the portion of the electromagnetic pulse reflected from the surface level of the fluid; and a pump controller, configured and arranged to receive distance information from the processor and to use the distance information to control the operation of a pump located in the wellbore, further wherein the magnitude and direction of change of the fluid level in the drill pipe is employed to control the pump operation speed or stroke to adjust the fluid level in the drill pipe.

2. A system as in claim 1, wherein the processor is further configured and arranged to analyze the signals to obtain information relating to a proportion of water to hydrocarbon in the fluid based on an amplitude of the detected portion.

3. A system for measuring two unmixed fluid levels in a wellbore containing a first wellbore fluid and a second wellbore fluid, the first wellbore fluid defining a first surface level, the second wellbore fluid defining a second surface level, the second wellbore fluid having a lower density than that of the first fluid and a dielectric constant that is both known and substantially lower than that of the first fluid, comprising:

a drill pipe positioned within a wellbore, the wellbore further being defined by a casing;

a pulse generator operable to generate a pulse of electromagnetic energy to propagate along the wellbore towards a surface level of the fluids;

the pulse of electromagnetic wave energy being transmitted along the drill pipe, the length of the wave being preselected and tuned to correlate to the internal diameter of the drill pipe, wherein the lower (minimum) cut-off wavelength ($\lambda$) is calculated to be about $\lambda=0.59$ (ID), wherein ID represents the internal diameter of the drill pipe, further wherein the wavelength of the wave energy deployed to propagate along the drill pipe is between about 1.1 and about 1.5 times the lower cut-off wavelength, and wherein the drill pipe and casing, together, act as a coaxial waveguide for transmission of the signal along the wellbore;

a detector operable to detect respective portions of the electromagnetic pulse reflected from the surfaces of the fluids and propagated along the wellbore towards the detector;

a processor, configured and arranged to receive a signal from the detector representative of the detected portions of the electromagnetic pulse and to analyze such detected portions to determine the first surface level of the first wellbore fluid and the second surface level of the second wellbore fluids; and a delay configured and arranged to define a detection time window for detecting the portion of the electromagnetic pulse reflected from the first or second surface level.

4. A method for measuring and controlling a surface level of a fluid level in a drill pipe of a wellbore using reflected electromagnetic wave energy having a wavelength tuned to the internal diameter of a drill pipe, with a pulse generator device in association with a top drive connected to the drill pipe, the method comprising:

(a) providing a drill pipe having a lower and upper end, the drill pipe positioned within a wellbore, the wellbore being defined by a casing;

providing a fluid disposed within the drill pipe, the upper portion of the fluid being defined by a surface level, the drill pipe connected to a top drive at its upper end;

(b) providing, in association with the top drive, a pulse generator device operable to generate a pulse of electromagnetic wave energy to propagate downward from the top drive and along the drill pipe towards the surface level of the fluid in the drill pipe, the pulse of electromagnetic wave energy being transmitted along the drill pipe, the length of the wave being preselected and tuned to correlate to the internal diameter of the drill pipe, wherein the lower (minimum) cut-off wavelength ($\lambda$) is calculated to be about $\lambda=0.59$ (ID), wherein ID represents the internal diameter of the drill pipe, further wherein the wavelength of the wave energy deployed to propagate along the drill pipe is between about 1.1 and about 1.5 times the lower cut-off wavelength, and wherein the drill pipe and casing, together, act as a coaxial waveguide for transmission of the signal along the wellbore;

(c) reflecting a portion of the pulse at the surface level of the fluid;

(d) providing a detector operable to detect a portion of the electromagnetic pulse that is reflected from the surface level of the fluid in the drill pipe and propagated along the wellbore towards the detector;

(e) providing a processor, configured and arranged to receive a signal from the detector representative of the detected portion of the electromagnetic pulse and to analyze the detected portion of the electromagnetic pulse to determine the position of the surface level of the surface of the fluid; and (f) providing a pump controller configured and arranged to receive distance information from the processor and to use the distance information to control the operation of a pump located in the wellbore.

* * * * *